(12) United States Patent
Boettcher et al.

(10) Patent No.: US 10,739,592 B2
(45) Date of Patent: Aug. 11, 2020

(54) VEHICLE WITH A HEAD-UP DISPLAY INTEGRATED INTO THE DASHBOARD

(71) Applicant: Volkswagen Aktiengesellschaft, Wolfsburg (DE)

(72) Inventors: Eike Boettcher, Braunschweig (DE); Matthias Lemke, Calberlah (DE); Martin Mokry, Wolfsburg (DE); Rainer Spieckermann, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/227,576

(22) Filed: Dec. 20, 2018

(65) Prior Publication Data
US 2019/0187470 A1    Jun. 20, 2019

(30) Foreign Application Priority Data

Dec. 20, 2017   (DE) .......................... 10 2017 223 436

(51) Int. Cl.
| | |
|---|---|
| *G02B 27/01* | (2006.01) |
| *B62D 25/14* | (2006.01) |
| *B60S 1/02* | (2006.01) |
| *B60R 11/02* | (2006.01) |
| *B60H 1/00* | (2006.01) |
| *B60K 35/00* | (2006.01) |
| *B60R 11/00* | (2006.01) |

(52) U.S. Cl.
CPC .......... *G02B 27/0149* (2013.01); *B60H 1/00* (2013.01); *B60K 35/00* (2013.01);
(Continued)

(58) Field of Classification Search
CPC ........ B60H 1/00; B60H 1/242; B60H 1/3407; B60K 2370/1529; B60K 2370/658;
(Continued)

(56) References Cited

U.S. PATENT DOCUMENTS

| | | |
|---|---|---|
| 5,305,011 A | 4/1994 | Furuya et al. |
| 5,905,477 A | 5/1999 | Kuwayama et al. |
| | (Continued) | |

FOREIGN PATENT DOCUMENTS

| | | |
|---|---|---|
| DE | 69201081 T2 | 5/1995 |
| DE | 69516981 T2 | 10/2000 |
| | (Continued) | |

OTHER PUBLICATIONS

English Translation of JP 2009051295.*

*Primary Examiner* — Hong Zhou
(74) *Attorney, Agent, or Firm* — Muncy, Geissler, Olds & Lowe, P.C.

(57) ABSTRACT

A vehicle with a front windshield and a dashboard, which has a ventilation device with a defroster air outlet, and which has a head-up display integrated into the dashboard and has a front windshield projector, and a shielding frame, which delimits a projection passage, through which the front windshield projector projects optical information onto the front windshield and/or onto a combiner screen disposed in the region of the front windshield. The shielding frame is formed closed in the form of a frame with a front frame part, facing the front windshield, and a rear frame part facing away therefrom, which are connected to one another via side frame parts. The front frame part of the shielding frame is made double-walled with an inner wall, delimiting the projection passage, and an outer wall facing the front windshield, which form the defroster air outlet therebetween.

10 Claims, 5 Drawing Sheets

(52) U.S. Cl.
CPC ........... *B60R 11/0229* (2013.01); *B60S 1/023* (2013.01); *B62D 25/142* (2013.01); *B60R 2011/0005* (2013.01); *B60R 2011/0043* (2013.01)

(58) Field of Classification Search
CPC ................ B60K 35/00; B60R 11/0229; B60R 2011/0005; B60R 2011/0043; B60S 1/023; B62D 25/142; G02B 27/01; G02B 27/0149
See application file for complete search history.

(56) References Cited

U.S. PATENT DOCUMENTS

| | | | | |
|---|---|---|---|---|
| 2009/0261612 | A1* | 10/2009 | Takayama | B60K 37/02 296/70 |
| 2016/0121852 | A1* | 5/2016 | Yoshimura | B60H 1/00564 454/127 |
| 2017/0059864 | A1* | 3/2017 | Takahashi | B60K 35/00 |
| 2017/0199381 | A1* | 7/2017 | Kuwabara | B60K 35/00 |

FOREIGN PATENT DOCUMENTS

| | | | |
|---|---|---|---|
| DE | 10140631 | A1 | 2/2003 |
| DE | 102007058441 | A1 | 6/2009 |
| DE | 102011055156 | A1 | 5/2012 |
| DE | 102011120431 | A1 | 2/2013 |
| DE | 102012021561 | A1 | 5/2013 |
| DE | 102015202457 | A1 | 8/2016 |
| EP | 0824216 | A1 | 2/1998 |
| EP | 1925489 | A1 | 5/2008 |
| JP | H1134652 | A | 2/1999 |
| JP | 2009051295 | A * | 3/2009 ......... B60H 1/00271 |
| JP | 2016088260 | A | 5/2016 |

* cited by examiner

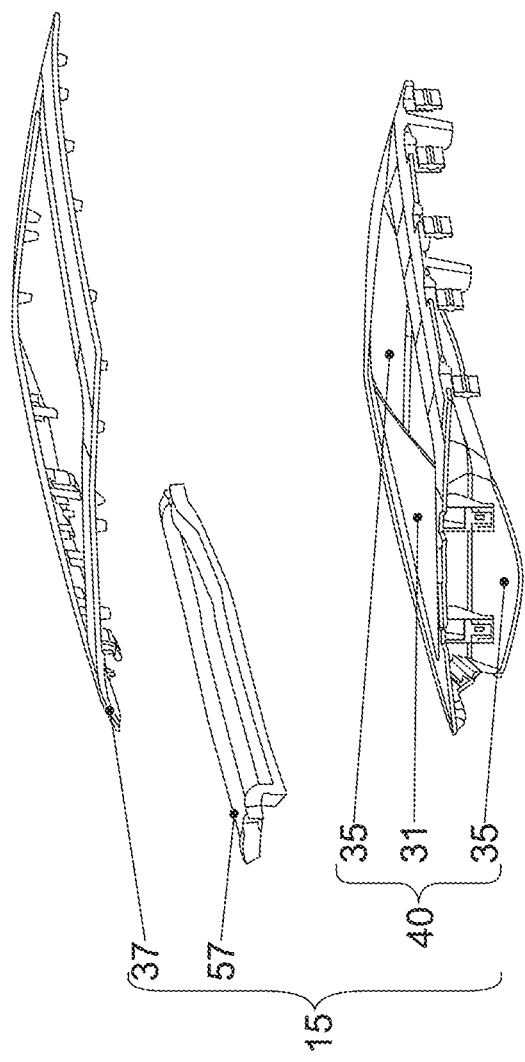

VEHICLE WITH A HEAD-UP DISPLAY INTEGRATED INTO THE DASHBOARD

This nonprovisional application claims priority under 35 U.S.C. § 119(a) to German Patent Application No. 10 2017 223 436.9, which was filed in Germany on Dec. 20, 2017 and which is herein incorporated by reference.

BACKGROUND OF THE INVENTION

Field of the Invention

The present invention relates to a vehicle having a head-up display, integrated into a dashboard.

Description of the Background Art

With the aid of a head-up display, optical information can be projected from the vehicle interior onto the front windshield of a vehicle and/or onto a so-called combiner screen disposed in the region of the front windshield, in particular in the vehicle interior in front of the front windshield. The head-up display is conventionally constructed of a front windshield projector and a shielding frame, which is disposed on a dashboard top side facing the front windshield. The shielding frame delimits inwardly a shaft-like projection passage. In addition, the shielding frame shields at least partially the front windshield projector from incident light.

A vehicle with a head-up display of this kind is known from DE 10 2007 058 441 A1. The circumferential shielding frame is closed in the form of a frame and is formed from a front frame part, facing the front windshield, and a rear frame part facing away from it, which are connected to one another via side frame parts. A defroster air outlet, which is part of a vehicle ventilation system, is formed in at least one of these frame parts of the circumferential shielding frame.

Both the vehicle ventilation system and the head-up display are positioned directly in the vicinity of the front windshield, as a result of which the components of the head-up display and the ventilation system are to be disposed with a high packing density for lack of installation space.

A further vehicle with a head-up display built into the dashboard is known from DE 10 2012 021 561 A1. However, in contrast to the invention, it does not have a shielding frame closed in the form of a frame, but only a wall element that extends a defroster channel in the direction of the vehicle interior. A further vehicle with a head-up display in which a shielding frame is used is known from the DE 10 2011 120 431 A1.

SUMMARY OF THE INVENTION

It is therefore an object of the invention to provide a vehicle in which a composite of components of the head-up display and the ventilation system is disposed with a reduced installation space in comparison with the prior art, especially in a vehicle longitudinal direction, and at the same time has an increased dimensional stability in comparison with the prior art.

According to an exemplary embodiment, the front frame part of the shielding frame can be made double-walled with an inner wall, delimiting the projection passage, and an outer wall facing the front windshield, which form the defroster air outlet therebetween. The shielding frame therefore has a torsion-resistant, dimensionally stable double-wall structure in its front region. Thus, the shielding frame of the invention is not only used for shielding against incident light, but also acts in a dual function as a stiffening element, with whose help the composite of components of the head-up display and the ventilation system can be rigidly connected to one another. In addition, the invention enables a structurally extremely compact arrangement of the ventilation system and the head-up display in the vehicle longitudinal direction.

In a technical implementation, the inner wall of the front frame part of the shielding frame can form a front shaft wall. This, together with a rear shaft wall of the rear frame part and side shaft walls of the side frame parts, can delimit the shaft-shaped projection passage through which the front windshield projector projects the optical information onto the front windshield. The total of four shaft walls can merge into one another in a closed manner at inner corner regions, wherein the shaft walls are preferably formed all completely closed and/or planar to ensure in a simple way a high component stiffness of the shielding frame and to ensure the faultless functioning of the shielding frame with respect to the shielding of incident light and with respect to the projection of the front windshield projector onto the front windshield.

With a view to reducing the mounting effort, the installation of the shielding frame is to be made as simple as possible. Against this background, the outer wall of the front frame part of the shielding frame at its upper end in the vehicle vertical direction can merge into an outwardly angled support flange. This can be supported on an opening edge region of a mounting opening in the dashboard, in particular in a visible dashboard support, and thus be welded therewith, for example. In the same way, the side shaft walls and the rear shaft walls can also have outwardly angled support flanges. These can be combined in a preferred embodiment variant to form a mutual support flange, which surrounds the projection passage in a closed manner in the form of a frame. The provision of such a support flange results, on the one hand, in a simple assembly and, on the other, in a further increase in the component rigidity of the shielding frame.

In the assembly position, the shaft-shaped projection passage at its lower passage edges, which face the front windshield projector, can be formed unattached, namely in particular spaced from the front windshield projector by a free mounting gap. In this case, it is preferred in terms of simple assembly, if the front windshield projector is not directly connected to the shielding frame but rather is attached independent of the shielding frame to the vehicle body, preferably, for example, to a module cross member running in the vehicle transverse direction.

The dashboard may in common practice have a visible outer dashboard support to which, for example, a foam layer and/or a slush skin are applied. The dashboard support can be supported on a main interior dashboard body that is covered, concealed from view, by the dashboard support. At least one defroster channel can be formed in the main dashboard body, which is fluidically connected to the defroster air outlet via a channel opening. In a simple embodiment variant, the defroster channel can be delimited upwardly in the vehicle vertical direction by an upper channel wall of the visible dashboard support and can be delimited downwardly in the vehicle vertical direction by a lower channel wall of the main dashboard body.

An example airtight connection of the shielding frame to the channel opening of the defrosting channel defined above is described below. Thus, the inner wall of the front frame part of the shielding frame may be connected in an airtight manner to a channel opening edge of the lower channel wall of the main dashboard body. In the same way, the support flange angled away from the outer wall of the front frame part of the shielding frame can also be connected in an airtight manner to a channel opening edge of the upper channel wall. This preferably occurs via a rigid connecting element. In the abovementioned connection of the shielding frame to the upper and lower channel walls, the outer wall of the front frame part of the shielding frame preferably remains spaced from the main dashboard body by a clearance or is unattached.

In an embodiment variant that is short in the vehicle longitudinal direction, the inner wall of the front frame part of the shielding frame can have a connection contour (for example, a tool-free detent contour or the like) for connecting the channel opening edge of the lower channel wall of the main dashboard body on its side facing away from the projection passage, whereas its wall side facing away therefrom directly delimits the projection passage.

In an embodiment variant structurally compact in the vehicle longitudinal direction, the support flange, angled away from the outer wall of the front frame part of the shielding frame, can be spaced from the front windshield with the formation of an airflow gap. A windshield base airflow for blowing air at the windshield base may be guided along the front windshield through the airflow gap. The windshield base airflow and the defroster airflow can be merged downstream of an outlet opening of the defroster air outlet and flow together along the front windshield.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows the shielding frame of the head-up display in a perspective exploded diagram.

DETAILED DESCRIPTION

Figure 1:
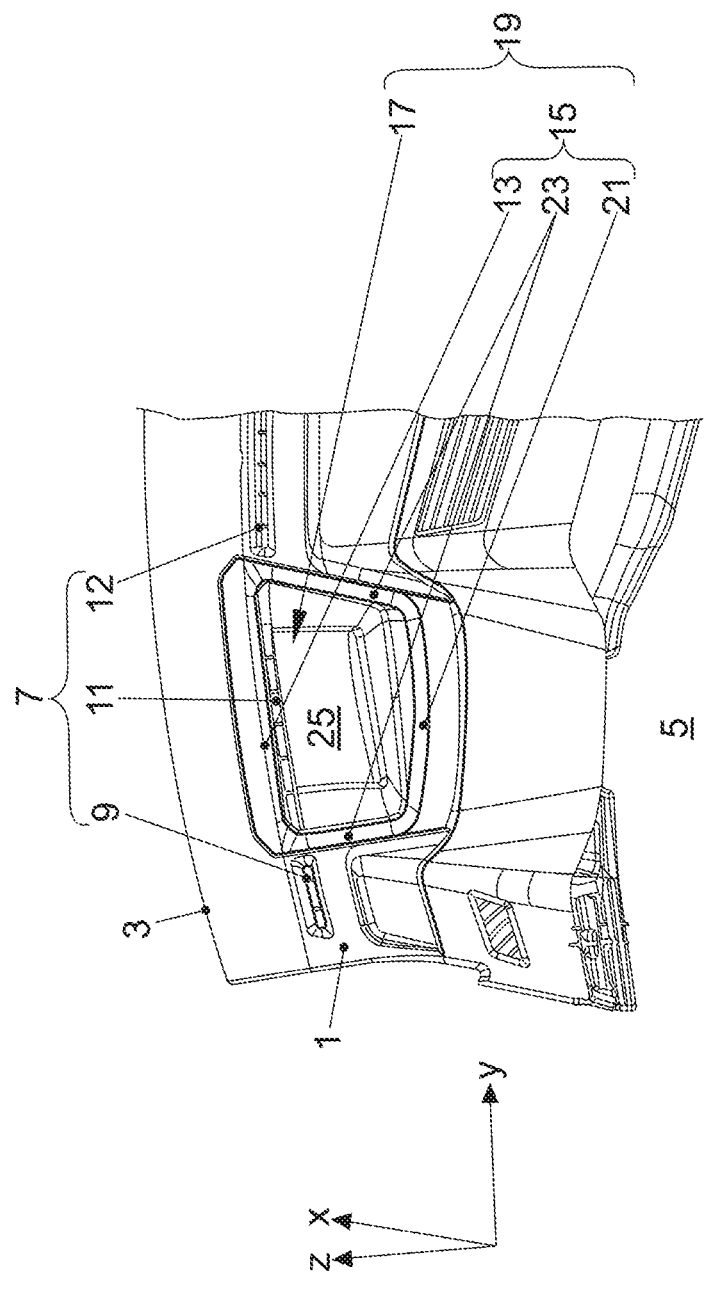
FIG. 1 shows a partial view of the dashboard and the front windshield forwards from the vehicle interior in the vehicle longitudinal direction x.

FIG. 1 shows a driver-side section of a dashboard 1 and a front windshield 3, which delimit a vehicle interior 5 forwards in the vehicle longitudinal direction x. A ventilation system 7, which has defroster air outlets 9, 11, 12, which are arranged in a row one behind the other in the vehicle transverse direction y, is built into dashboard 1. The two side defroster air outlets 9, 12 are integrated directly in a top side of dashboard 1, whereas middle defroster air outlet 11 is integrated into a front frame part 13 of a shielding frame 15. Shielding frame 15 together with a front windshield projector 17 is part of a head-up display 19 built into dashboard 1, with which optical information for the driver is projected onto front windshield 3 while driving. In FIG. 1, shielding frame 15 is made closed in the form of a frame and approximately rectangular, namely with a rear frame part 21 which is connected to front frame part 13 via two side frame parts 23.

Shielding frame 15 delimits inwardly a shaft-like projection passage 25, through which front windshield projector 17 projects optical information onto front windshield 3. In addition, shielding frame 15 at least partially shields front windshield projector 17 from incident light. In a functional extension, defroster air outlet 11 is additionally integrated into front frame part 13 of shielding frame 15. For this purpose, in FIG. 2, front frame part 13 is formed as a double-wall structure with an inner wall 29, delimiting projection passage 25, and an outer wall 31 facing front windshield 3. Defroster air outlet 11 is delimited between inner wall 29 and outer wall 31.

Figure 2:
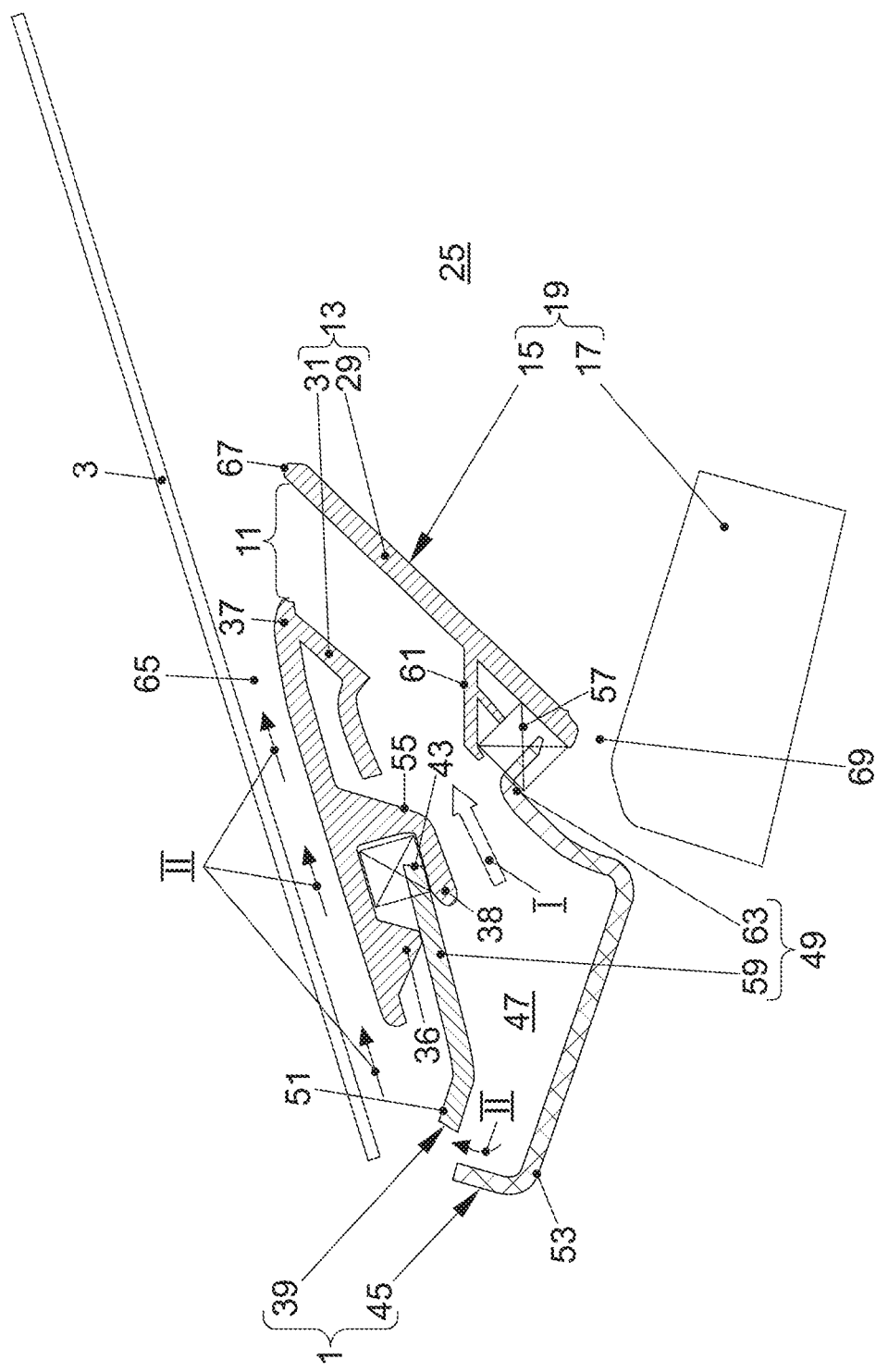
FIG. 2 shows an enlarged partial sectional view of the defroster air outlet along an xz sectional plane from FIG. 1.

As is further apparent from FIG. 2, inner wall 29 of front frame part 13 of shielding frame 15 forms a front shaft wall which, together with a rear shaft wall 33 (FIG. 4) of rear frame part 21 and with side shaft walls 35 of side frame parts 23, delimit the shaft-shaped projection passage 25. Shaft walls 29, 31, 33, 35 enclose projection passage 25 with a completely closed surface. Each shaft wall 29, 31, 33, 35 is made planar, wherein the shaft walls merge into each other in a closed manner at inside corners. As a result and in conjunction with the above double-wall structure, the overall result is an extremely rigid and space-saving shielding frame 15, which can be built into dashboard 1 with a reduced space requirement.

To further increase component rigidity, shielding frame 15 has an outwardly angled circumferential support flange 37, which is angled outwardly at the upper end of projection passage 25. In the assembly position shown in FIG. 2, circumferential support flange 37 of shielding frame 15 is supported on a visible dashboard support 39 of dashboard 1, namely on an opening edge region of a mounting hole 43 (FIG. 2) introduced in dashboard support 39. Visible dashboard support 39 has on its outer side by way of example a multi-layer structure of a foam layer and an outer slush skin. Dashboard support 39 covers an inner main dashboard body 45, which is concealed from view and in which ventilation system 7 is formed.

Figure 3:
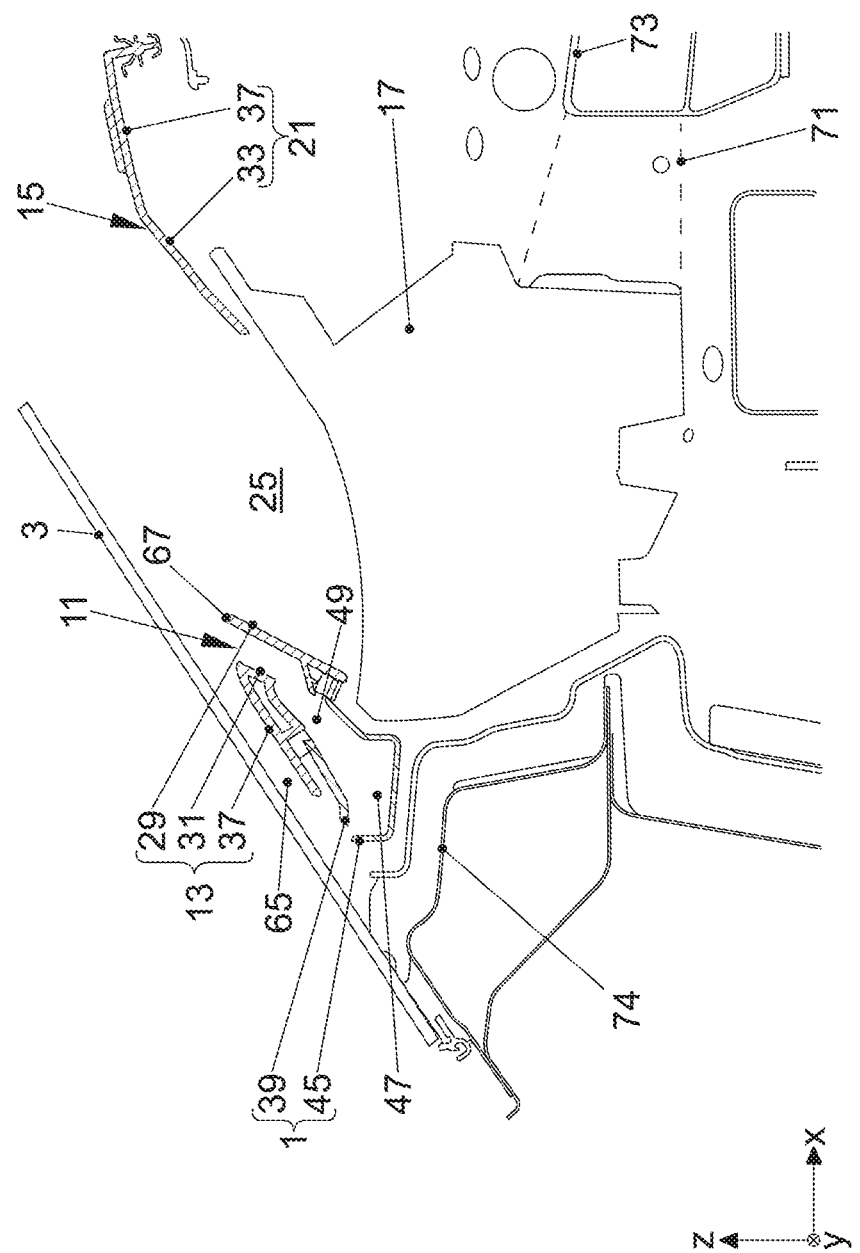
FIG. 3 shows a further sectional diagram along the xz sectional plane with further components in the vicinity of the defroster air outlet.

As is further apparent from FIG. 2 or 3, a defroster channel 47 running in the vehicle transverse direction y is fluidically connected to defroster air outlet 11 via a channel opening 49. In FIG. 2, defroster channel 47 is delimited upwardly in the vehicle vertical direction z by an upper channel wall 51 of dashboard support 39 and delimited downwardly in the vehicle vertical direction z by a trough-shaped lower channel wall 53 of main dashboard body 45. According to FIG. 2, angled support flange 37 has a detent contour 55 with an indicated connecting element 57 in order to connect a channel opening edge 59 of upper channel wall 51 in an airtight manner to support flange 37. For connection to channel opening edge 59 of upper channel wall 51, an upper rib 36 and a lower guide 38 are formed on support flange 37, between which channel opening edge 59 of upper channel wall 51 is inserted.

In addition, inner wall 29 of front frame part 13 has, concealed from view, on its side facing away from projection passage 25, a further connection contour 61 (FIG. 2) to which channel opening edge 63 of lower channel wall 53 of main dashboard body 45 is connected. In addition to the attachment described above, shielding frame 15 is attached to dashboard support 39 on the sides and back by means of catch elements.

In FIG. 2, support flange 37 is spaced from front windshield 3 by an air flow gap 65. A windshield base airflow II is guided through air flow gap 65. This is merged downstream of an outlet opening 67 of defroster air outlet 27 with a defroster air flow I, which is guided through defroster air outlet 11.

As is further apparent from FIG. 2, lower edge 69 of projection passage 25 is not placed directly on front windshield projector 17, but rather spaced therefrom by a free mounting gap 69. Front windshield projector 17 is fastened in FIG. 3, independently of shielding frame 15, via indicated fastening straps 71 to a module cross member 73 and/or to a windshield cross member 74 (FIG. 3).

Figure 4:
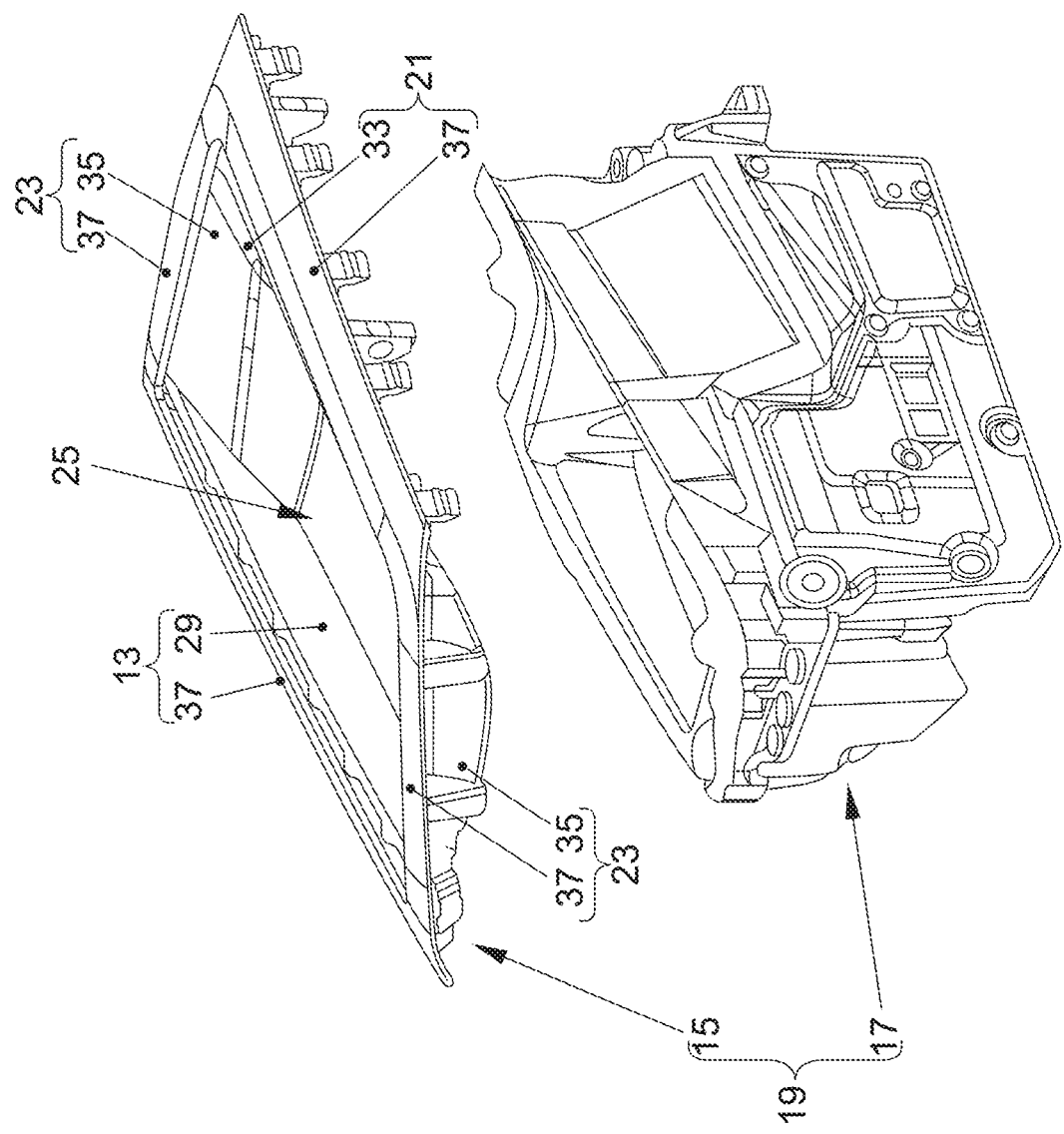
FIG. 4 shows an exploded diagram of the head-up display comprising the shielding frame and the front windshield projector.

In FIG. 4, head-up display 19 is shown in an exploded diagram and separately. Accordingly, head-up display 19 has shielding frame 15 and front windshield projector 17. Shielding frame 15 is constructed in two parts according to further FIG. 5, namely with frame-shaped circumferential flange 37, maintained as a separate component, and shaft walls 29, 33, 35 interconnected likewise in a closed manner in the form of a frame. The two components separate from one another in FIG. 5 are connected to one another, for example, by means of a plastic welding process. In addition, frame-shaped connecting element 57, with which defroster air outlet side 11, formed in front frame part 13, can be connected in an airtight manner to defroster channel 47, is shown in FIG. 5.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
an interior with a portion thereof being delimited on a front by a front windshield and a dashboard, which has a ventilation device with a defroster air outlet, via which the front windshield is acted upon by a defroster air flow; and
a head-up display integrated into the dashboard and has a front windshield projector and a shielding frame that delimits a projection passage through which the front windshield projector projects optical information onto the front windshield and/or onto a combiner screen disposed in a region of the front windshield, wherein the shielding frame at least partially shields the front windshield projector from incident light,
wherein the shielding frame is formed closed in a form of a frame with a front frame part facing the front windshield in a vehicle longitudinal direction, and a rear frame part facing away therefrom, which are connected to one another via side frame parts,
wherein the front frame part of the shielding frame is made double-walled with an inner wall delimiting the projection passage, and an outer wall facing the front windshield, wherein the defroster air outlet is formed between the inner wall and the outer wall, and
wherein an upper end, in a vehicle vertical direction, of the outer wall of the front frame part of the shielding frame, and/or side shaft walls of the side frame parts and/or a rear shaft wall of the rear frame part, merge into an outwardly angled support flange which is supported on an opening edge region of a mounting opening in the dashboard.

2. The vehicle according to claim 1, wherein the inner wall of the front frame part of the shielding frame forms a front shaft wall which, together with a rear shaft wall of the rear frame part and side shaft walls of the side frame parts, delimit the projection passage, and the front shaft wall, the rear shaft wall and the side shaft walls merge into one another in a closed manner at inside corners and/or the shaft walls are all formed with a completely closed surface and/or planar.

3. The vehicle according to claim 1, wherein the support flange is supported on the opening edge region of the mounting opening in the dashboard by an upper rib and a lower guide, which are molded onto the support flange.

4. The vehicle according to claim 3, wherein the support flange, closed in the form of a frame, surrounds the projection passage and the defroster air outlet.

5. The vehicle according to claim 3, wherein the support flange, angled away from the outer wall of the front frame part of the shielding frame, is spaced from the front windshield by an airflow gap through which a windshield base airflow for blowing air at the windshield base is guided along the front windshield and wherein the windshield base airflow and the defroster airflow are merged downstream of an outlet opening of the defroster air outlet.

6. The vehicle according to claim 1, wherein lower edges of the projection passage, facing the front windshield projector, are unattached or spaced from the front windshield projector by a free mounting gap, or wherein the front windshield projector, independent of the shielding frame, is attached to a module cross member or a windshield cross member of the vehicle body.

7. The vehicle according to claim 1, wherein the dashboard has a visible dashboard support and a main dashboard body, which is covered and concealed from view by the dashboard support, wherein at least one defroster channel is formed in the main dashboard body, which is fluidically connected to the defroster air outlet via a channel opening, and wherein the at least one defroster channel is delimited upwardly in the vehicle vertical direction by an upper channel wall of the dashboard support and downwardly in the vehicle vertical direction by a lower channel wall of the main dashboard body.

8. The vehicle according to claim 7, wherein the inner wall of the front frame part of the shielding frame is connected in an airtight manner to a channel opening edge of the lower channel wall, wherein a support flange angled away from the outer wall of the front frame part of the shielding frame is connected in an airtight manner to a channel opening edge of the upper channel wall via a connecting element, and wherein the outer wall of the front frame part of the shielding frame is spaced from the main dashboard body by a clearance or in contrast is unattached.

9. The vehicle according to claim 8, wherein a side of the inner wall facing away from the projection passage has a connection contour for connecting the channel opening edge of the lower channel wall of the main dashboard body to the inner wall of the front frame part, so that the channel opening edge of the lower channel wall of the main dashboard body is connected and concealed from view on the side facing away from the projection passage.

10. A vehicle comprising:
an interior with a portion thereof being delimited on a front by a front windshield and a dashboard, which has a ventilation device with a defroster air outlet, via which the front windshield is acted upon by a defroster air flow; and a head-up display integrated into the dashboard and has a front windshield projector and a shielding frame that delimits a projection passage through which the front windshield projector projects optical information onto the front windshield and/or onto a combiner screen disposed in a region of the front windshield, wherein the shielding frame at least partially shields the front windshield projector from incident light, wherein the shielding frame is formed closed in a form of a frame with a front frame part facing the front windshield in a vehicle longitudinal direction, and a rear frame part facing away therefrom, which are connected to one another via side frame parts, wherein the front frame part of the shielding frame is made double-walled with an inner wall delimiting the projection passage, and an outer wall facing the front windshield, wherein the defroster air outlet is formed between the inner wall and the outer wall, wherein the dashboard has a visible dashboard support and a main dashboard body, which is covered and concealed from view by the dashboard support, wherein at least one defroster channel is formed in the main dashboard body, which is fluidically connected to the defroster air outlet via a channel opening, and wherein the at least one defroster channel is delimited upwardly in the vehicle vertical direction by an upper channel wall of the dashboard support and downwardly in the vehicle vertical direction by a lower channel wall of the main dashboard body.

* * * * *